United States Patent Office 3,357,932
Patented Dec. 12, 1967

3,357,932
POLYURETHANES PREPARED FROM CHLORO-
CARBONIC ACID ESTER REACTION PROD-
UCTS WITH N-ALKYLALKANOLAMINES
Wolfgang Heydkamp and Erwin Müller, Leverkusen, and
Wilhelm Kallert, Cologne-Stammheim, Germany, as-
signors to Farbenfabriken Bayer Aktiengesellschaft,
Leverkusen, Germany, a German corporation
No Drawing. Filed June 3, 1964, Ser. No. 372,383
Claims priority, application Germany, June 6, 1963,
F 39,932
3 Claims. (Cl. 260—2.5)

ABSTRACT OF THE DISCLOSURE

Polyurethane plastics are prepared by reacting organic polyisocyanates with hydroxyl containing compounds prepared from polyfunctional chlorocarbonic acid ester having a molecular weight of from about 500 to about 4000 with essentially 1 mol of an N-alkylalkanolamine per chlorocarbonic acid ester group.

This invention relates to polyurethane plastics and to a method of preparing the same. More particularly, it relates to polyurethanes prepared from particular active hydrogen compounds.

The production of cross-linked synthetic resins from high molecular weight di- and polyhydroxyl compounds and diisocyanates is known. Polyesters, polyethers, polythioethers and polyacetals are used as high molecular weight di- and polyhydroxyl compounds. Of these compounds, polyesters and polyethers are mainly used in practice for the production of cross-linked synthetic resins. In spite of the excellent properties of such synthetic resins as materials, the products obtained from polyesters are insufficiently stable to hydrolysis, due to the fact that the ester groups are saponifiable, whereas the materials produced from polyethers are liable to aging by oxygen or ozone due to the formation of peroxide. Owing to their high melting point and the reactiveness of the urethane groups with isocyanates, high molecular weight polyhydroxyl compounds having molecular weights of 500 to 4000 and containing urethane groups as chain linking members (for example, reaction products of polyhydric alcohols and a deficiency of diisocyanates) are unsuitable as starting materials for the production of synthetic resins.

It is an object of this invention to provide new polyurethane plastics. It is another object of this invention to provide an improved process for preparing polyurethane plastics. It is still another object of this invention to provide polyurethane foams, elastomers and coatings.

The foregoing objects and others which will become apparent from the following description are accomplished in accordance with the invention generally speaking by providing polyurethane plastics by reacting an organic polyisocyanate with an organic compound containing at least two active hydrogen atoms which are reactive with NCO groups and the groups

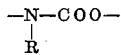

where R is alkyl including unsaturated alkyl or cycloalkyl, and prepared by reacting polyfunctional halocarbonic acid esters with N-alkyl alkanolamines. The preparation of the active hydrogen compound may be carried out in an aqueous medium in the presence of hydrochloric acid acceptors such as alkali metal hydroxides or alkali metal carbonates.

As the reaction of the chlorocarbonic acid esters with N-alkyl alkanolamines is difficult to control, the latter may also be used in the form of their hydrochlorides. By gradually adding hydrochloric acid acceptors and at the same time, stirring in the polyfunctional chlorocarbonic acid ester, the reaction proceeds as required.

The proportions between the polychlorocarbonic acid esters and the secondary polyamines are so chosen that essentially one mol of N-alkyl alkanolamine is used per each chlorocarbonic acid ester group. Slight deviations to less or more are allowable. The condensation products so obtained then contain hydroxyl groups as end groups. Their molecular weight is practically determined by the molecular weight of the polychlorocarbonic acid.

The invention can be illustrated by the following schematical equations, given but not restricted to a linear polyalkyleneglycol ether such as polypropyleneglycol ether or polytetrahydrofuran HO–G–OH. The chlorocarbonic ester thereof has the formula

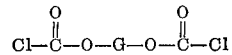

which is reacted with one mol of N-alkyl alkanolamine per each functional group of the ester to give the N-alkyl polyurethane:

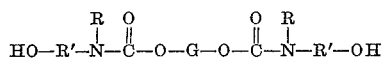

G is the residue of the polyester or polyether upon removal of the terminal hydroxy groups. R is the alkyl radical including cycloalkyl and unsaturated alkyl, R' is the residue of the alkanolamine upon removal of the OH-groups and the secondary amino group.

If the reaction is carried out in organic solvents, suitable solvents for example, are benzene, toluene, chlorobenzene or xylene and suitable hydrochloric acid acceptors are tertiary amines, pyridines or also alkali metal hydroxides and alkali metal carbonates.

Suitable chlorocarbonic acid esters for the preparation of N-alkylpolyurethanes are the di-chlorocarbonic acid esters of polyethylene-, polypropylene- and polybutylene glycol and hydroxyl polyesters. Suitable trifunctional compounds are, for example, tri-chlorocarbonic acid esters of branched polyalkylene glycol ethers and polyesters. The use, either alone or as additional reactants, of trifunctional chlorocarbonic acid esters, leads to branched N-alkyl-polyurethanes. The polyethers and polyesters are those used in the art of polyurethane chemistry. They have preferably a molecular weight of from 400 to 4000.

The following compounds are examples of suitable N-alkyl alkanolamines: N-allyl-ω-hydroxyethylamine, N-methyl - ω - hydroxyethylamine, N-propyl-ω-hydroethylamine, N-cyclohexyl - ω - hydroxymethylamine, N-butyl-ω-hydroxypropylamine, N-isobutyl - ω - hydroethylamine, N-hexyl-ω-hydroxypropylamine.

Since one mol of N-alkylalkanolamine adds to each functional end group of the chlorocarbonic ester, the molecular weight of the resulting poly-N-alkylurethane is only slightly increased over that of the basic polyether or polyester. The poly-N-alkylurethane, therefore, has a molecular weight of about 500 to 4000, preferably 1500 to 2000. In these ranges, the N-alkylpolyurethanes are more or less viscous oils which are comparable in their consistency with liquid polyesters and therefore eminently suitable for reaction with polyisocyanates.

The reaction with polyisocyanates and, if desired, chain lengthening agents and/or cross linking agents to form cross-linked synthetic resins, including foam plastics and sheets, may be carried out by various methods known per se. Any suitable polyisocyanate may be used, such as, for example, N-butylene-diiosocyanate, hexamethylene-diisocyanate, m-xylylene-diisocyanate, p-xylylene-diisocyanate, 4,6 - dimethyl - 1,3 - xylylene-diisocyanate, cyclohexane - 1,4 - diisocyanate, dicyclohexylmethane-4,4' - diisocyanate, m-phenylene-diisocyanate, p-phenylene-diisocyanate, 1 - alkylbenzene - 2,4 - diisocyanates, 3 - ($\alpha$-isocyanateethyl)-phenylisocyanate, 1 - alkyl-benzene - 2,6 - diisocyanates, 2,6 - diethylbenzene - 1,4-diisocyanate, diphenylmethane - 4,4' - diisocyanate, 3,3'-dimethoxy-diphenylmethane - 4,4' - diisocyanate, naphthalene - 1,5 - diisocyanate, higher functional polyisocyanates including 1 - methyl-benzene-2,4,6-triisocyanate and reaction products of 1 mol of a trihydric alcohol with 3 mols of a diisocyanate and the like.

The reaction may be carried out with the molten substance or in a solvent. With polyfunctional N-alkylpolyurethanes or polyfunctional isocyanates one obtains cross linked products which are suitable as lacquer coatings, adhesives and molding masses. If mainly bifunctional starting materials are used, linear products are obtained which are generally further reacted with chain lengthening agents and/or cross linking agents. Suitable cross linking agents are, for example, glycols such as ethylene glycol, butylene glycol, di-hydroxyethylene hydroquinone-ether, xylylene glycol, hexanediol, cyclohexanediol and the like; diamines such as p-phenylenediamine, ethylene diamine, butylene diamine, 4,4'-diaminodiphenylmethane, amino alcohols, such as aminoethyl alcohol, aminobutyl alcohol and the like, hydrazines, hydrazide compounds and water. The elastic synthetic resins are produced either by a casting process in which the molten reaction components, which still contain NCO groups, are poured into molds and hardened, or in known manner via intermediate stages which can be stored and no longer contain any free NCO groups, cross linking and hardening being effected by incorporating further polyisocyanates, especially dimeric toluylene diisocyanate. These storage-stable materials may also be cross linked with cross linking agents such as sulphur, formaldehyde or peroxides, cross linking with sulphur being particularly indicated when the alkyl groups in the N-alkyl-polyurethanes used as starting material are unsaturated, e.g. allyl- or cyclo-hexenyl methyl groups. Cross linking by means of formaldehyde is particularly to be recommended when sites for formaldehyde cross linking exist, for example, as a result of using di-$\beta$-hydroxyethyl-m-toluidine as chain lengthening agent. Cross linking by peroxide may also be particularly recommended when lateral allyl- or benzyl groups are present or when 4,4'-diphenylmethane-diisocyanate has been used as isocyanate component.

Foam plastics are obtained in known manner by using an excess of diisocyanates and using water as chain lengthening agent or cross linking agent, carbon dioxide being evolved and the high molecular weight structure formed then expanding. Inert blowing agents such as haloalkanes may be used in addition to or instead of water. If bi-functional starting materials are used and only a deficiency of isocyanate groups so that they are all used up or if the reaction and cross linking are stopped in good time, polyurethane masses are obtained which may be worked up as thermoplastic materials and which can be injection molded or extruded to threads, foils and the like on the usual machines.

The high molecular weight compound containing at least two hydrogen atoms reactive with isocyanates, that is the poly-N-alkylurethane has the characteristic group

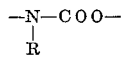

bound to a terminal hydroxylalkyl radical.

The synthetic resins produced by the process according to the invention differ from the products obtained from polyesters by their much greater resistance to hydrolysis, which is due to the fact that the N-alkylurethane group is difficult to saponify. The products of the process differ from synthetic resins obtained from polyethers by their better resistance to oxygen and ozone. Synthetic resins produced on the basis of polypropylene glycol ether give rise to numerous difficulties in working up, due to the secondary character of the terminal hydroxyl groups. The conversion of polypropylene glycol to N-alkylurethane by means of N-alkyl-$\omega$-hydroxyalkylamines via the di-chlorocarbonic acid ester gives rise to products which are easily worked up on a technical scale and which manifest the good properties due to the N-alkyl-urethane group in addition to the good properties of polypropylene glycol.

The invention is further illustrated but not limited by the following examples in which parts are by weight unless otherwise specified.

Example 1

(A) Preparation of starting material.

About 345 parts of potassium carbonate in about 500 parts by volume of water are added to about 300 parts N-methyl-ethanolamine in about 2000 parts by volume of benzene, and about 2250 parts di-chlorocarbonic acid ester of polypropylene glycol (molecular weight 1000) are added dropwise at 25–30° C. After heating for about 2 hours at about 60° C., the organic phase is separated, washed with water until free from salt, and freed from solvent. Yield 96–97% of theoretical; pale yellow, slightly viscous oil (OH number 92–93).

(B) Reaction according to the invention.

After heating the starting material for about ½ hour at about 120° C. and 12 mm. Hg, about 52 parts diphenylmethane-4,4'-diisocyanate are stirred in, and about 20 parts of di($\beta$-hydroxyethyl-)-hydroquinone are added after about 20 minutes. After about 10 hours at about 100° C., the material has the following properties:

| | |
|---|---|
| Tensile strength (DIN 53504) _____ kg.[1]/cm.$^2$__ | 146 |
| Elongation at break _____ percent__ | 240 |
| Tension at 20% elongation _____ kw./cm.$^2$__ | 99 |
| Structural strength _____ kw__ | 45 |
| Shore hardness (DIN 53505) A _____ | 97 |
| Shore hardness (DIN 53505) D _____ | 51 |
| Elasticity (DIN 53512) _____ percent__ | 31 |

[1] Kilogram weight.

Example 2

(A) Preparation of starting material.

About 72.5 parts N-methylethanolamine in about 500 parts by volume of benzene are treated with about 100 parts potassium carbonate in about 150 parts by volume of water and about 1465 parts of di-chlorocarbonic acid ester of polybutylene glycol (molecular weight 2800) dissolved in about 1500 parts by volume of benzene are added dropwise. A 98–99% yield of a pale brown thickly viscous oil which crystallizes slowly is obtained. OH number 37, melting point 34–36°.

(B) Reaction according to the invention.

About 200 parts of (A) are melted with about 60 parts of naphthylene-1,5-diisocyanate at about 30° C. and then treated with about 17 parts butanediol-1,4 by the method according to Example 3. A synthetic resin having the following properties results.

| | |
|---|---|
| Tensile strength (DIN 53504) _____ kw./cm.$^2$__ | 197 |
| Elongation at break _____ percent__ | 515 |
| Tension at 20% elongation _____ kw./cm.$^2$__ | 84 |
| Tension at 300% elongation _____ kg./cm.$^2$__ | 150 |
| Structural strength _____ kw__ | 32 |
| Shore hardness (DIN 53505) A _____ | 96 |
| Shore hardness (DIN 53505) D _____ | 42 |
| Elasticity _____ percent__ | 55 |

Using about 40 parts of naphthylene-1,5-diisocyanate for about 200 parts of starting material (A) and about 9 parts butanediol-1,4, a rubbery elastic material having the following properties is obtained:

| | |
|---|---:|
| Tensile strength (DIN 53504) kg./cm.² | 152 |
| Elongation at break percent | 505 |
| Tension at 20% elongation kg./cm.² | 50 |
| Tension at 300% elongation kw./cm.² | 100 |
| Structural strength kw. | 28 |
| Shore hardness (DIN 53505) A | 90 |
| Shore hardness (DIN 53505) D | 42 |
| Elasticity percent | 54 |

*Example 3*

(A) Preparation of starting material.

About 150 parts N-methylethanolamine dissolved in about 2000 parts by volume benzene are reacted with the dichlorocarbonic acid ester of polypropylene glycol (molecular weight 1950) in the presence of aqueous potassium carbonate solution. A 95–96% yield of a slightly viscous oil is obtained (OH number 53.5).

(B) Reaction according to the invention.

About 200 parts of the starting material (A) are reacted by melting with about 58 parts naphthylene-1,5-diisocyanate and about 15 parts butanediol by the process according to Example 3. A synthetic resin having the properties given in Column 1 are obtained.

When about 26 parts m,m'-dichloro-p,p'-diaminodiphenylmethane are added to about 200 parts of starting material (A) and about 38.5 parts of toluylene-2,4-diisocyanate, a synthetic resin having the properties given in Column 2 is obtained.

| | 1 | 2 |
|---|---:|---:|
| Tensile strength (DIN 53504) kw./cm.² | 112 | 98 |
| Elongation at break, percent | 360 | 290 |
| Tension at 20% elongation, kw./cm.² | 71 | 44 |
| Tension at 300% elongation, kw./cm.² | 106 | |
| Structural strength, kg | 31 | 15 |
| Shore hardness (DIN 53505) A | 96 | 89 |
| Shore hardness (DIN 53505) B | 39 | |
| Elasticity, percent | 54 | 37 |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed:

1. A polyurethane plastic prepared by the process which comprises reacting (A) an organic polyisocyanate with (B) an organic polyhydroxy compound having a molecular weight of from about 500 to about 4000, said organic polyhydroxy compound having been prepared by reacting (C) a polyfunctional chlorocarbonic acid ester of a polyalkylene ether glycol with (D) essentially 1 mol of an N-alkylalkanolamine per chlorocarbonic acid ester group.

2. A cellular polyurethane plastic prepared by the process which comprises reacting in the presence of (A) a blowing agent (B) an organic polyisocyanate with (C) an organic polyhydroxy compound having a molecular weight of from about 500 to about 4000, said organic polyhydroxy compound having been prepared by reacting (D) a polyfunctional chlorocarbonic acid ester of a polyalkylene ether glycol with (E) essentially 1 mol of N-alkylalkanolamine per chorocarbonic acid ester group.

3. Elastomeric polyurethane plastics prepared by the process which comprises reacting (A) an organic polyisocyanate, with (B) a chain extending agent containing active hydrogen atoms which are reactive with NCO groups and (C) an organic polyhydroxy compound having a molecular weight of from about 500 to about 4000, said organic polyhydroxy compound having been prepared by reacting (D) a polyfunctional chlorocarbonic acid ester of a polyalkylene ether glycol with (E) essentially 1 mol of an N-alkylalkanolamine per chlorocarbonic acid ester group.

References Cited

UNITED STATES PATENTS

| 2,660,574 | 11/1953 | Jones et al. | 260—77.5 |
| 2,843,569 | 7/1958 | Benning et al. | 260—77.5 |
| 2,929,800 | 3/1960 | Hill | 260—77.5 |
| 2,987,494 | 6/1961 | Black | 260—77.5 XR |

FOREIGN PATENTS 573,724  4/1959  Canada.

DONALD E. CZAJA, *Primary Examiner.*

F. McKELVEY, J. KLOCKO, G. RAUCHFUSS,
*Assistant Examiners.*